United States Patent [19]

Cibie

[11] 4,389,698
[45] Jun. 21, 1983

[54] HEADLAMP INTER ALIA FOR MOTOR VEHICLES

[75] Inventor: Pierre Cibie, Bobigny, France

[73] Assignee: Cibie Projecteurs, Bobigny, France

[21] Appl. No.: 217,281

[22] Filed: Dec. 16, 1980

[30] Foreign Application Priority Data

Dec. 20, 1979 [FR] France ............................ 79 31257

[51] Int. Cl.³ ............................................. F21V 7/04
[52] U.S. Cl. ...................................... 362/32; 362/61; 362/80; 362/83; 362/338; 362/340
[58] Field of Search .................. 362/32, 61, 80, 83, 362/326, 331, 332, 336, 338, 339, 340

[56] References Cited

U.S. PATENT DOCUMENTS

| | | | |
|---|---|---|---|
| 2,589,569 | 3/1952 | Peter | 362/32 |
| 3,437,804 | 4/1969 | Schaefer | 362/32 |
| 3,487,206 | 12/1969 | Dawson | 362/80 |
| 4,151,582 | 4/1979 | Grunbeger | 362/32 |
| 4,177,505 | 12/1979 | Carel | 362/80 |

Primary Examiner—Donald P. Walsh
Attorney, Agent, or Firm—Alan H. Levine

[57] ABSTRACT

This invention relates to a headlamp inter alia for motor vehicles.

The headlamp comprises a lens (1) formed by a number of juxtaposed dioptric elements (4) each having a focal point (F) and an axis (5); a light source (6–10) is provided for each element (4) vary near the focal point thereof; the axes (5) of the various dioptric elements (4) are so arranged that the elementary light beams issuing from the elements (4) when the corresponding sources (6–10) are illuminated form a single beam having a predetermined light distribution.

Of use for the construction of very shallow headlamps suitable for integration in the bodywork.

8 Claims, 4 Drawing Figures

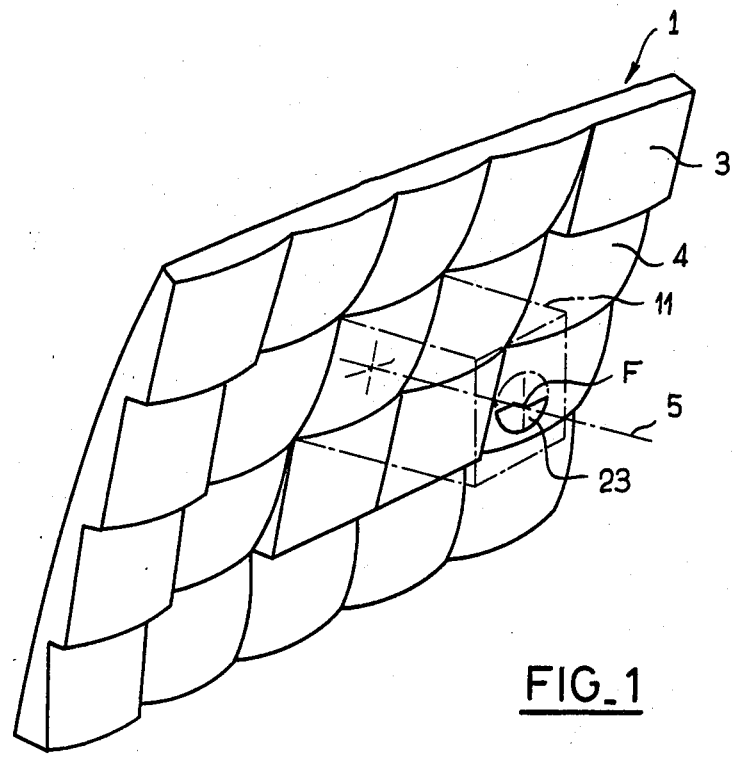
FIG_1
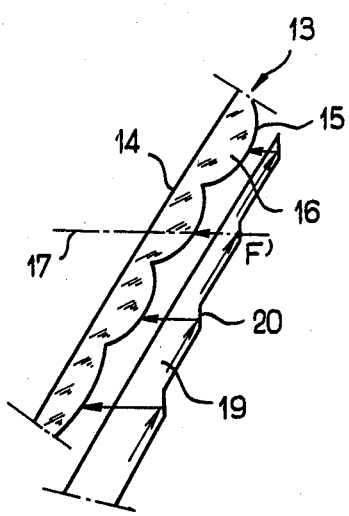
FIG_4

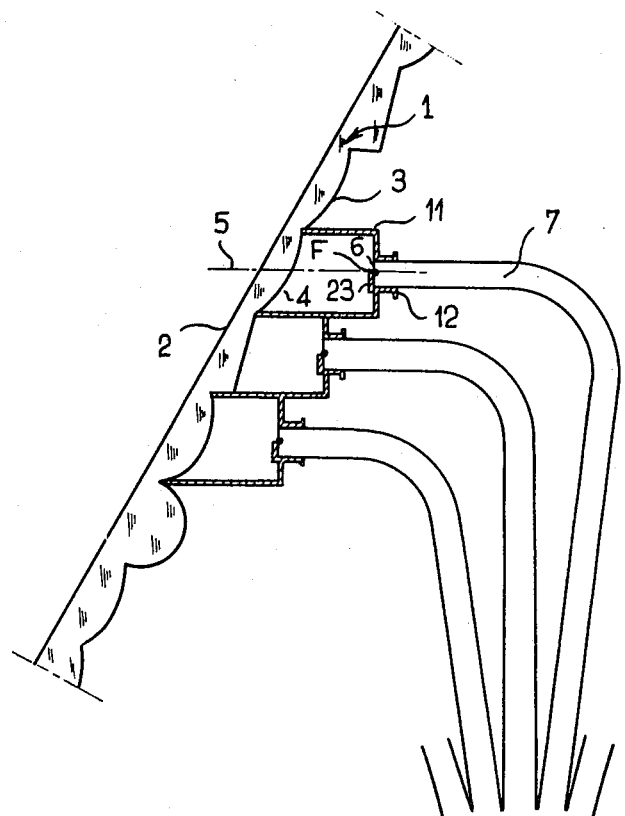
FIG_2
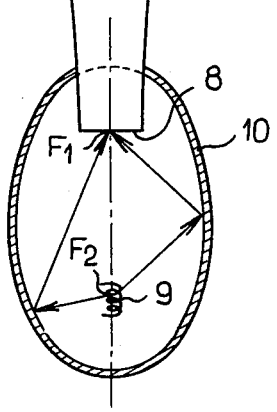

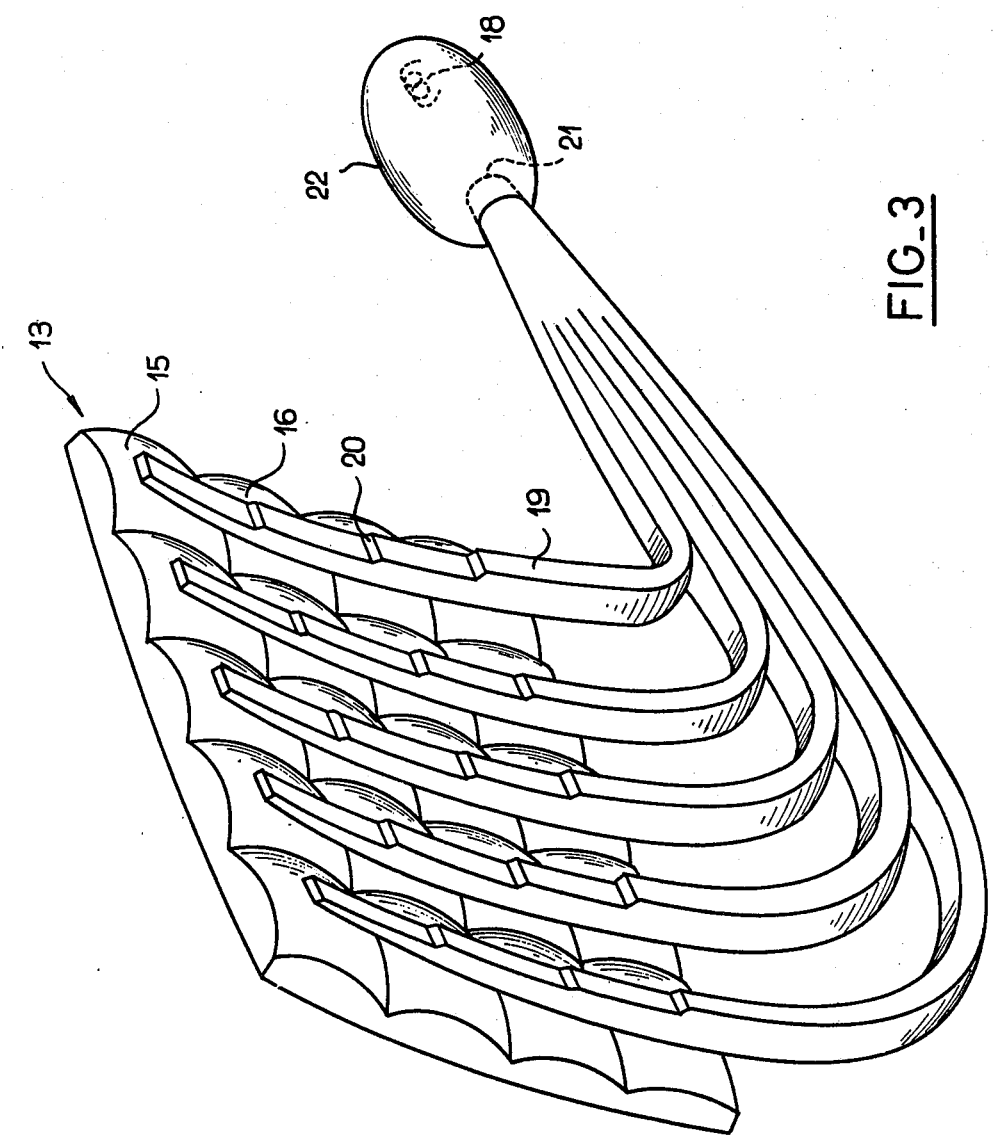
FIG_3

HEADLAMP INTER ALIA FOR MOTOR VEHICLES

This invention relates to headlamps inter alia for motor vehicles.

Conventionally headlamps have a reflector which is usually parabolic and which has an exit surface closed by a lens. A bulb filament is disposed very near the focal point of the reflector and, when electrically energized, emits a radiation which the reflector reflects towards its exit surface and which the lens, which has appropriate optical characteristics for the required purpose, converts into a light beam of a particular shape conforming to certain rules or standards.

Headlamps of this kind have the disadvantage of being very deep—i.e., taking up considerable space along their reflector axis—because of the size of the reflector, and the disadvantage is all the more critical in that the maximum dimensions of the reflector in directions perpendicular to its axis—i.e., the dimensions of the lens in plan—are considerable.

Another disadvantage of headlamps of traditional design is that they are difficult to fit into streamlined bodywork; inter alia it is difficult for the lens front surface to be at a substantial inclination to the vertical, since such a feature further increases the depth of the headlamp and also leads to optical problems.

It is the object of this invention to obviate these disadvantages; the invention accordingly proposes a novel headlamp construction suitable for very flat designs and for satisfactory integration of the headlamp in even streamlined bodywork.

These objectives are achieved in accordance with the invention by omitting the reflector and replacing it by formation of the light beam by a large number of dioptric elements disposed suitably in a lens, each such element having a focal point and, disposed thereat, a light source which can be real or, and preferably, virtual and which can take the form e.g. of the image of a filament of a bulb placed some way away, the filament image being transmitted through an optical duct system.

If the dioptric elements are of short focal length, the depth of a headlamp can be reduced to less than 50 mm.

Also, the various dioptric elements can be placed in different relative positions matching any external lens shape suitable for integrating the lens in the shape of the bodywork.

The headlamp in accordance with the invention inter alia for motor vehicles and comprising a transparent lens and at least one light source is characterised in that the lens is embodied by a number of juxtaposed dioptric elements each having a focal point and an axis; a light source is provided for each element very near the focal point thereof; and the axes of the various dioptric elements are so arranged that the elementary light beams issuing from the elements when the sources are illuminated form a single beam having a predetermined light distribution.

Other features and advantages of the invention will become apparent from the following description of two non-limitative embodiments and from the accompanying drawings which are an integral part of the description and in which:

FIG. 1 is a view of a headlamp lens in accordance with a first embodiment of the invention, the view being in perspective and from the lens surface which will subsequently face towards the vehicle interior;

FIG. 2 is a diagrammatic view of the first embodiment of the invention, the view being in section on a vertical plane perpendicular to the mean orientation of the lens;

FIG. 3 is a view similar to FIG. 1 of a second embodiment of a headlamp in accordance with the invention, and FIG. 4 shows a detail of the second embodiment in a view similar to FIG. 2.

Referring first to FIGS. 1 and 2, there can be seen a headlamp lens 1 having towards the outside of the vehicle an e.g. smooth lens 2 and having a shape following intimately the general shape of the front of the vehicle, the lens 1 having on the side facing towards the vehicle interior a surface 3 having reliefs defining a number of juxtaposed dioptric elements 4, for instance, arranged as a matrix or network of square meshes. Other juxtapositions of the dioptric elements are of course possible an the lens surface reliefs defining them can also be contrived partly or wholly on the lens surface 2.

The dimensions in plan of each element 4 are small in relation to the dimensions in plan of the lens 1 and so there is a large number of elements 4; the number is limited in FIGS. 1 and 2 for reasons of clarity but, for instance, 200 dioptric elements on a side of 12 mm are used for a headlamp lens 120 mm high and 250 mm wide, the figures being of course exemplary and non-limitative.

Preferably, each of the dioptric elements 4 is of the convergent type and has a focal length of the same order as the smallest of its dimensions in plan—i.e., of the order of 12 mm in the non-limitative example just outlined.

Referring to FIG. 2, a dioptric element 4 has an approximately horizontal axis 5 and a focal point F near lens surface 3. Advantageously, as will become apparent hereinafter, the respective axes, as 5, of the various juxtaposed dioptric elements, as 4, have different orientations and diverge from surface 3 towards surface 2 of lens 1 so that the headlamp emits a divergent beam outwardly in front of the vehicle.

At the focal point, as F, of each element 4, a transverse end, as at 6, of an optical duct, as 7, of any known kind inter alia in the form of an optical fibre bunch or in the form of a transparent moulding, terminates opposite the element 4 and along the axis, as 5, thereof.

Advantageously, the other transverse end face 8 of duct 7 merges with the transverse end faces of the other optical ducts associated with the various juxtaposed dioptric elements, as 4, and is disposed opposite a bulb filament 9 which, when electrically energized, transmits into the common end face 8 of the optical ducts, as 7, a light which travels along the ducts and issues from the second transverse end thereof, as 6, at the focal point, as F, of each of the dioptric elements, then leaves the same by way of the lens surface 2 as an elementary light beam oriented along the axis 5 of the corresponding element 4; if the axes 5 of the various dioptric elements 4 are at different orientations, the total beam resulting from the elementary beams has the required light distribution.

There are various ways and means of increasing the light yield of the system.

For instance, any known means can be used to concentrate on the duct end face 8 the radiation emitted by the energized filament 9; as a non-limitative example, an ellipsoidal reflector 10 is shown as being disposed around end face 8 and filament 9, one focal plane of reflector 10 coinciding with surface 8 and focal points F1, F2 of reflector 10 coinciding with the centre of end face 8 and with a central zone of filament 9 respectively.

Also, each duct, as 7, is so shaped that the light issuing through its end face 8 provides optimum coverage of the corresponding dioptric element, as 4; accordingly, the duct zone nearer the duct end face 6, and the end face 6 itself, are given very well adapted shaping and dimensioning.

If, for instance, that zone of the duct, as 7, which is nearer its end surface, as 6, is cylindrical and has a diameter dn and if fn denotes the focal length of the dioptric element, as 4—i.e., the distance separating it from its focal point, as F, along its axis, as 5, the beam issuing from the element 4 by lens surface 2 will have a divergence of half an angle of tangential arc opening dn/2fn.

The position of the transverse end face, as 6, of each light duct, as 7, relatively to the corresponding dioptric element, as 4, is secured by any means, such as means rigidly secured directly to the lens 1 on its surface 3; for instance, a tubular element, as 11, is shown around each element 4, the element projecting parallel to the element axis 5 on lens surface 3; in the zone furthest away from the element 4, the element 11 has fitted gripping means 12 whose aperture intimately matches and grips the periphery of the optical duct 7 very near its end face 6. The means 12, which is accurately centred relatively to the axis 5, can be cut to have a mask 23 (visible in FIGS. 1 and 2) which partially masks the duct end face 6 when the headlamp is of the dipping kind and illuminates only downwardly. This cut-off mask could be devised in other ways, for instance, directly on the end face, as 6 and other means can be used to produce a dipped beam, such as appropriate shaping of the duct 7 very near its end face 6 and appropriate shaping of the end face 6 itself or else an appropriate distribution of the elements 4 on the lens 1 and an appropriate orientation of their respective optical axes, as 5. A headlamp combining a dipped beam and a main beam can be devised by associating with two different zones of the lens 1—i.e. with elements, as 4, different from the lens 1 and disposed appropriately—respective optical ducts, as 7, associated with a filament, as 9, which is energized both for dipped and main beam lighting, and optical ducts, as 7, associated with a second filament, as 9, energized exclusively for main beam lighting.

Other features could of course be adopted without for that reason departing from the scope of this invention.

The shallowness in relation to the lens of a headlamp in accordance with the invention is apparent; the total depth necessary for the headlamp at its lens, measured perpendicularly thereto at each point thereof, is of the order of the focal distance fn plus the limit winding radius of an optical duct, as 7, giving a figure of less than 45 mm in the case of the numerical example previously quoted. The use of optical ducts makes it possible to shift the bulb (only the filament, as 9, of which has been shown) and the means concentrating its radiation on the entry surface, as 8, of the bunch of the optical ducts, as 7, to a zone relatively far away from the lens, e.g. below the engine bonnet of the vehicle, where the space taken up by the elements is not disadvantageous and where also the elements are readily accessible, for instance, for bulb changing.

FIGS. 3 and 4 show another embodiment of the invention using a lens 13 similar to the lens 1 and having an outside surface 14 and an inside surface 15 corresponding to the surfaces 2, 3 respectively, and a system of juxtaposed dioptric elements, as 16, similar to the elements 4 of the lens 1. Each element, as 16, has an axis, as 17, similar to the axis 5, the relative orientations of the various axes 17 possibly being similar to those of the various axes 5. A dioptric element, as 16, has a focal point F', corresponding to the focal point F of the previous embodiment. In the case shown in FIGS. 1 and 2, the focal lengths of the various dioptric elements, as 4, are identical, whereas in the embodiment shown in FIGS. 3 and 4 the focal lengths are not identical and, for instance, increase downwardly. However, different focal lengths could be possible in the embodiment of FIGS. 1 and 2 and focal lengths varying differently from the manner shown or identical focal lengths will be possible in the embodiment of FIGS. 3 and 4.

Like the embodiment shown in FIGS. 1 and 2, the embodiment shown in FIGS. 3 and 4 uses optical ducts to transmit to the focal point, as F', of each dioptric element, as 16, at a virtual light source the radiation of a real light source such as a filament of a remote bulb 18.

In FIGS. 3 and 4, however, a number of dioptric elements disposed e.g. in a column are energized through a single optical duct, as 19, in the form of a bar extending along the corresponding column of dioptric elements near lens surface 15.

Opposite each dioptric element 16 the bar 19 is formed with a step, as 20, which is, with advantage, for instance, metallized to improve its reflectance, so that some of the radiation from the filament 18 transmitted through the bar 19 is reflected on the step 20 towards the corresponding dioptric element 16 and seems to come from the focal point F' thereof so as to issue from lens surface 14 as a light beam having as its axis the axis 17 of the dioptric element.

As FIG. 3 shows, the various dioptric elements, as 16, which are juxtaposed to define the lens 13, are arranged in columns each energized through a bar-like optical light duct, as 19, the various bars forming the respective end zones of optical ducts which also have a, for instance, common transverse end face 21 opposite the filament 18, while appropriate means such as an elliptical reflector 22 are preferably provided to concentrate on the surface 21 the radiation from the filament 18 when the same is energized electrically.

The dioptric elements forming the lens 13 could of course be distributed in rows each illuminated by a bar and, as in FIGS. 1 and 2, means could be provided to cut off the beam issuing from lens surface 14 when a dipped beam is required, either by appropriate design of each of the dioptric elements or of the corresponding zone of a bar or by selective illumination of the bars.

As a non-limitative example, the dioptric elements, as 16, can in plan resemble a square of a side of 30 mm with a focal length of 30 mm, which gives a bar having a thickness of approximately 7.5 mm. Conveniently, eight bars are disposed opposite a 250 mm wide lens, as shown in FIG. 3, and the bars together form at their common end face 21 a surface having an area of 20 mm$^2$ which is readily covered by the image of the filament 18 by way of the ellipsoidal reflector 22.

These figures are of course given by way of non-limitative example.

The invention, although more particularly described with reference to headlamps inter alia for motor vehicles, is of use in other areas of lighting and signalling without for that reason departing from the scope of the invention.

I claim:

1. A motor vehicle headlamp, comprising:
 (a) a lens having a plurality of juxtaposed dioptric elements, at least some of said dioptric elements being arranged in a row,
 (b) a light-transmitting bar extending along the row of dioptric elements adjacent to the interior surface of the lens, said bar carrying a reflecting zone opposite each dioptric element in the row,
 (c) a light source spaced from the lens, and
 (d) an optical duct terminating at one end in said transparent bar and at its other end near the light source,
 (e) whereby light from the light source is transmitted along the light-transmitting bar, the light being reflected by each reflecting zone through its respective dioptric element to create a light beam issuing from the headlamp.

2. A headlamp as defined in claim 1 wherein each dioptric element has a focal point, and said reflecting zones are located at or near the focal points of their respective dioptric elements.

3. A headlamp as defined in claim 1 wherein the lens has a number of rows of dioptric elements, a light-transmitting bar extending along each row of dioptric elements, each bar carrying a reflecting zone opposite each dioptric element in its respective row, all the light-transmitting bars merging into a common optical duct which terminates near the light source.

4. A headlamp as defined in claim 3 including means for concentrating light from the light source on the end of the optical duct.

5. A headlamp as defined in claim 1 wherein each dioptric element has an axis along which light beams issue, all the axes diverging toward the exterior of the headlamp.

6. A headlamp as defined in claim 1 including means for cutting off light passing through each dioptric element to produce a dipped beam.

7. A headlamp as defined in claim 1 wherein each dioptric element has a focal length of the order of the smallest dimension of the dioptric element when it is viewed in plan.

8. A headlamp as defined in claim 1 wherein the dioptric elements are formed in relief on the inside surface of the lens, and the outside surface of the lens closely follows the shape of the motor vehicle body.

* * * * *